United States Patent
Roesner et al.

(10) Patent No.: US 9,758,147 B2
(45) Date of Patent: Sep. 12, 2017

(54) METHOD FOR SHUTTING OFF AN INTERNAL COMBUSTION ENGINE

(71) Applicant: Robert Bosch GmbH, Stuttgart (DE)

(72) Inventors: Julian Roesner, Untergruppenbach (DE); David Vitre, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/492,197

(22) Filed: Sep. 22, 2014

(65) Prior Publication Data

US 2015/0088355 A1 Mar. 26, 2015

(30) Foreign Application Priority Data

Sep. 20, 2013 (DE) .................. 10 2013 218 907
Jul. 4, 2014 (DE) .................. 10 2014 213 080

(51) Int. Cl.
*G06F 19/00* (2011.01)
*B60W 10/08* (2006.01)
*B60W 10/06* (2006.01)
*B60W 20/00* (2016.01)
*B60W 20/40* (2016.01)

(52) U.S. Cl.
CPC ............ *B60W 10/08* (2013.01); *B60W 10/06* (2013.01); *B60W 20/00* (2013.01); *B60W 20/40* (2013.01); *B60W 2510/0657* (2013.01); *B60W 2510/083* (2013.01); *B60W 2710/083* (2013.01); *B60W 2710/085* (2013.01); *Y02T 10/6286* (2013.01)

(58) Field of Classification Search
USPC .............. 701/22, 54, 66; 903/902, 930, 903; 180/65.28, 65.285, 65.21, 65.22; 477/3; 475/269
See application file for complete search history.

(56) References Cited

U.S. PATENT DOCUMENTS 5,844,342 A * 12/1998 Miyatani ................ B60K 6/543 310/112
6,971,969 B2 * 12/2005 Kitagawa ............... B60K 28/10 180/65.265

(Continued)

FOREIGN PATENT DOCUMENTS

DE       10123037     11/2002
DE       102006006107  8/2007

(Continued)

OTHER PUBLICATIONS

Implementation of fuzzy logic controller for parallel hybrid electric vehicle; Nashed, M.N. ; Wahsh, S. ; Galal, H. ; Dakroury, T. World Automation Congress (WAC), 2010; Publication Year: 2010 , pp. 1-6.*

(Continued)

*Primary Examiner* — Cuong H Nguyen
(74) *Attorney, Agent, or Firm* — Norton Rose Fulbright US LLP; Gerard Messina

(57) ABSTRACT

A method is described for shutting off an internal combustion engine in a vehicle that comprises an internal combustion engine and an electrical machine, an electrical torque furnished by the electrical machine being adapted in such a way that a change per unit time in a total torque lies within a definable range, the total torque being made up at least of a torque of the internal combustion engine and the electrical torque.

14 Claims, 2 Drawing Sheets

(56) References Cited

U.S. PATENT DOCUMENTS

| | | | |
|---|---|---|---|
| 7,353,100 B2* | 4/2008 | Chen | F16H 61/0437 477/133 |
| 7,431,111 B2* | 10/2008 | Nada | B60K 6/445 180/65.28 |
| 7,455,134 B2* | 11/2008 | Severinsky | B60H 1/004 180/65.1 |
| 7,520,353 B2* | 4/2009 | Severinsky | B60H 1/004 180/65.265 |
| 7,559,388 B2* | 7/2009 | Severinsky | B60H 1/004 180/65.21 |
| 7,770,678 B2* | 8/2010 | Nozaki | B60K 6/48 180/65.265 |
| 8,078,371 B2* | 12/2011 | Cawthorne et al. | 701/54 |
| 8,169,173 B2* | 5/2012 | Doerr et al. | 318/432 |
| 8,171,824 B2* | 5/2012 | Miyazaki | B60K 6/387 74/661 |
| 8,352,139 B2* | 1/2013 | Hatori | B60K 6/387 180/65.285 |
| 8,498,765 B2* | 7/2013 | Tajima | B60K 6/48 180/65.1 |
| 8,725,336 B2* | 5/2014 | Kobayashi | B60W 10/10 180/65.265 |
| 2009/0112412 A1* | 4/2009 | Cawthorne et al. | 701/54 |
| 2009/0203481 A1* | 8/2009 | Nohara | B60K 6/365 475/150 |
| 2010/0078238 A1* | 4/2010 | Oba | B60K 6/40 180/65.225 |
| 2010/0234171 A1* | 9/2010 | Tanba | B60K 6/387 477/5 |
| 2010/0262323 A1* | 10/2010 | Tanba | B60K 6/387 701/22 |
| 2010/0262324 A1* | 10/2010 | Hatori | B60K 6/387 701/22 |
| 2012/0072065 A1* | 3/2012 | Minamikawa | B60K 6/445 701/22 |
| 2013/0311018 A1* | 11/2013 | Nissato | B60W 20/10 701/22 |
| 2013/0325238 A1* | 12/2013 | Kato | B60W 10/06 701/22 |
| 2014/0309828 A1* | 10/2014 | Yamazaki | B60L 11/123 701/22 |
| 2015/0088355 A1* | 3/2015 | Roesner | B60W 20/40 701/22 |

FOREIGN PATENT DOCUMENTS

| | | | |
|---|---|---|---|
| DE | 602004012838 | | 5/2009 |
| DE | 102010014162 A1 * | 12/2010 | B60K 6/387 |
| DE | 102010014971 | | 10/2011 |
| EP | 2289750 A1 * | 3/2011 | B60L 11/14 |
| JP | 5340790 B2 * | 11/2013 | B60W 10/02 |

OTHER PUBLICATIONS

Fuzzy logic based control strategy for parallel hybrid electric vehicle; Wahsh, S. ; Hamed, H.G. ; Nashed, M.N.F. ; Dakrory, T. Mechatronics and Automation, 2008. ICMA 2008. IEEE International Conference on; DOI: 10.1109/ICMA.2008.4798720 Publication Year: 2008 , pp. 27-31.*

Engine emissions modeling for a hybrid electric vehicle; Gray, D.L. ; Hentea, T.I.; Energy Conversion Engineering Conference, 2002. IECEC '02. 2002 37th Intersociety; DOI: 10.1109/IECEC. 2002.1392141; Publication Year: 2002 , pp. 745-750.*

Adaptive Fuzzy Controller for Hybrid Traction Control System based on Automatic Road Identification; Jianlong Zhang ; Deling Chen ; Chengliang Yin; Automation Science and Engineering, 2006. CASE '06. IEEE International Conference on DOI: 10.1109/COASE.2006.326936; Publication Year: 2006 , pp. 524-529.*

Supercapacitor-based torque booster for downsized Ice vehicle; Wang, J. ; Xia, Z.P. ; Taylor, B. ; Howe, D. Power Electronics, Machines and Drives, 2004. (PEMD 2004). Second International Conference on (Conf. Publ. No. 498) vol. 1; DOI: 10.1049/cp:20040259; Publication Year: 2004 , pp. 55-60 vol. 1.*

Experimental Characterisation of a Super-capacitor Based Electrical Torque Boost System for Down-sized ICE Vehicles; Wang, J. ; Taylor, B. ; Sun, Z. ; Howe, D; Vehicle Power and Propulsion Conference, 2006. VPPC '06. IEEE; DOI: 10.1109/VPPC.2006. 364286; Publication Year: 2006 , pp. 1-6.*

Effects of drivetrain hybridization on fuel economy and dynamic performance of parallel hybrid electric vehicles; Lukic, S.M. ; Emadi, A.; Vehicular Technology, IEEE Transactions on; vol. 53 , Issue: 2; DOI: 10.1109/TVT.2004.823525; Publication Year: 2004 , pp. 385-389.*

Development of a hybrid electric sport utility vehicle; Parten, M. ; Maxwell, T; Vehicular Technology Conference, 2001. VTC 2001 Fall. IEEE VTS 54$^{th}$; vol. 4; DOI: 10.1109/VTC.2001.957139; Publication Year: 2001 , pp. 2221-2224 vol. 4.*

Dynamic model and analysis of distributed control system algorithms of three wheel vehicle; Bogdan Fabianski; Bartlomiej Wicher Methods and Models in Automation and Robotics (MMAR), 2014 19th International Conference on; Year: 2014 pp. 70-75, DOI: 10.1109/MMAR.2014.6957327.*

Analytical Approach for the Power Management of Blended-Mode Plug-In Hybrid Electric Vehicles; Menyang Zhang; Yan Yang; Chunting Chris MI ; IEEE Transactions on Vehicular Technology; Year: 2012, vol. 61, Issue: 4; pp. 1554-1566, DOI: 10.1109/TVT. 2012.2187318.*

Modification of electric drive vehicles performances using a direct torque control with over-modulation ability; Ahmad Ghaderi; Javad Soltani; Mohammad Ebrahimi; Amir Ali Forough Nassiraei ; Industrial Electronics Society, IECON 2015—41st Annual Conference of the IEEE; Year: 2015; pp. 002874-002879, DOI: 10.1109/IECON. 2015.7392538.*

Control strategy optimization of a hybrid fuel cell vehicle with braking energy regeneration; Liang-fei Xu; Jian-feng Hua; Xiang-jun Li; Qing-ran Meng; Jian-qiu Li; Ming-gao Ouyang ; 2008 IEEE Vehicle Power and Propulsion Conference; Year: 2008 pp. 1-6, DOI: 10.1109/VPPC.2008.4677674.*

Optimal efficiency control of PM hybrid motor drives for electrical vehicles; C. C. Chan et al.; PESC97. Record 28th Annual IEEE Power Electronics Specialists Conf. Power Processing and Electronic Specialists Conf 1972; Year: 1997, vol. 1;pp. 363-368; 363-368 vol. 1, DOI: 10.1109/PESC.1997.616750.*

Research on the overall efficiency optimization-based power management strategy of the two-mode PSHEV;Weida Wang; Donghao Zhang et al.; Proceedings of the 33rd Chinese Control Conf.; Year: 2014; pp. 6959-6963, DOI: 10.1109/ChiCC.2014.6896147.*

Comparison between a novel claw-pole electrically magnetized synchronous machine without slip-rings and a permanent magnet machine; D. Martinez-Munoz; M. Alakula; Electric Machines and Drives Conference, 2003. IEMDC'03. IEEE International Year: 2003, vol. 3; pp. 1351-1356 vol. 3, DOI: 10.1109/IEMDC.2003. 1210627.*

Explicit MPC PHEV energy management using Markov chain based predictor: Development and validation at Engine-In-The-Loop testbed; Raja Sangili Vadamalu; Christian Beidl; 2016 European Control Conference (ECC); Year: 2016; pp. 453-458, DOI: 10.1109/ECC.2016.7810326.*

Feed forward disturbance rejection by a multiple FIFO approach for transient operation of an engine test bench; H. Kokal; P. Colaneri; L. del Re; M. Schmidt; M. Paulweber; 2013 IEEE International Conference on Control Applications (CCA); Year: 2013 pp. 65-70, DOI: 10.1109/CCA.2013.6662745.*

Research on Fuzzy Logic Control Strategy for a Plug-in Hybrid Electric City Public Bus; Yushan Li; Qingliang Zeng; Chenglong Wang; Yuanjie Li; 2010 International Conference on Measuring Technology and Mechatronics Automation; Year: 2010, vol. 3 pp. 88-91, DOI: 10.1109/ICMTMA.2010.754.*

Development of a hybrid electric sport utility vehicle; M. Parten; T. Maxwell; IEEE 54th Vehicular Technology Conference. VTC Fall 2001. Proceedings (Cat. No. 01CH37211); Year: 2001, vol. 4; pp. 2221-2224 vol. 4, DOI: 10.1109/VTC.2001.957139.*

* cited by examiner

METHOD FOR SHUTTING OFF AN INTERNAL COMBUSTION ENGINE

FIELD OF THE INVENTION

The present invention relates to a method for shutting off an internal combustion engine.

BACKGROUND INFORMATION

In vehicles, electrical machines are used e.g. as a starter for an internal combustion engine or e.g. as a generator for generating electrical power. In modern vehicles, electrical machines are also used as a combination of starter and generator, as so-called "starter generators." Starter generators are electrical machines that can be operated in a vehicle as an electric motor or as a generator, as required. As a generator, starter generators must be able to take on all tasks conventionally handled by the generator, namely supplying electricity to the vehicle electrical system and charging the vehicle battery. As an electric motor, starter generators must quickly bring the crankshaft of the internal combustion engine up to the necessary starting rotation speed when said engine is started.

Undesired rotation speed oscillations can occur upon shutoff of an internal combustion engine in a vehicle. Such rotation speed oscillations become transferred to the vehicle's body, and this is perceived by vehicle occupants as unpleasant. Such rotation speed oscillations occur in particular, for example, in a start-stop mode in which the internal combustion engine of the vehicle is automatically shut off at a standstill.

German Published Patent Appln. No. 101 23 037 A1 or German Patent No. 60 2004 012 838 T2 disclose, for example, apparatuses or methods for controlled shutoff of an internal combustion engine. Here the rotation speed profile of the internal combustion engine is adapted to a defined rotation speed profile by the fact that a torque is applied to a crankshaft by an electrical machine, with the result that the rotation speed of the internal combustion engine is raised or lowered depending on the situation.

These methods require rapid implementations of the torques to be applied, however, in order to adapt the rotation speed in real time. Such rapid implementations are difficult to realize because of the communication required in the vehicle.

Another possibility would be accurate setting of a rotation speed for the electrical machine, although implementing this in real time is complicated.

It is therefore desirable to describe a capability for preventing or at least reducing, in a simple manner, vibrations upon shutoff of an internal combustion engine which are perceptible to vehicle occupants.

SUMMARY

A method according to the present invention for shutting off an internal combustion engine in a vehicle that has an internal combustion engine and at least one electrical machine, in particular of claw-pole design, in which an electrical torque is adapted in such a way that a change per unit time in a total torque that is made up at least of a torque of the internal combustion engine and the electrical torque (i.e. a total torque gradient) lies within at least one definable range, makes possible controlled and comfortable shutoff of the internal combustion engine. A useful time unit can be in particular in the range of a few or a few tens of milliseconds, e.g. 10 ms. Adaptation of the electrical torque preferably occurs over a time period during shutoff of the internal combustion engine. It can begin with the beginning of the shutoff operation and/or when the rotation speed falls below an upper threshold, and it can end when the rotation speed falls below a lower threshold or when a standstill is reached and/or after a certain time has elapsed. Vibrations that are perceptible in the vehicle are avoided or at least decreased by the actions according to the present invention. The definable range can be defined by an upper limit and a lower limit, or by a definable range width around a target value. In order to minimize the total torque gradient, the upper limit and lower limit are usefully close to zero, or the target value is usefully zero. The width of the range around the target value is usefully selected to be as small as possible but as large as necessary so as also to permit practical implementation.

A reaction torque that acts on the bodywork via the engine mounts is equal to the product of the moment of inertia and angular acceleration of the crankshaft. To avoid the occurrence of vibration and noise in the bodywork, it would firstly be sufficient to minimize the reaction torque, i.e. to minimize the angular acceleration of the crankshaft. This conflicts, however, with the desire to bring the internal combustion engine quickly from idle speed to shutdown. What is minimized is therefore not the reaction torque or angular acceleration, but rather the variation over time, or gradient, of the reaction torque or angular acceleration.

Preferably the electrical torque is controlled in open- or closed-loop fashion as a function of the torque of the internal combustion engine. This allows the total torque to be influenced more accurately.

Advantageously, a target torque for the electrical machine is firstly calculated from the present torque of the internal combustion engine and is then implemented by the electrical machine. This allows the total torque to be accurately influenced.

It is further advantageous if the present torque of the internal combustion engine is calculated from an angle of a crankshaft and at least one cylinder filling of the internal combustion engine. These values are usually available in any case for the internal combustion engine, and thus also enable simple calculation of the requisite target torque.

It is particularly advantageous if the target torque of the electrical machine corresponds to the negative of the torque of the internal combustion engine together with an offset. It is thereby possible for the sum of the electrical torque and the torque of the internal combustion engine to be brought to a constant value, or at least for only small changes to be allowed.

Preferably the negative of the torque of the internal combustion engine is additionally scaled with a factor, and/or the change over time is adapted in another manner, for example by replacing or omitting specific values. This is useful when the maximum electrical torque that can be applied by the electrical machine is not sufficient to entirely compensate for the torque of the internal combustion engine.

Advantageously, a method according to the present invention is used when the internal combustion engine and the electrical machine each have a calculation unit, in particular a control unit, for control application. The target torque can then be calculated in the (hereinafter "first") calculation unit of the internal combustion engine (so-called "engine control unit") and transferred to the (hereinafter "second") calculation unit of the electrical machine (e.g. so-called "inverter").

Because these two calculation units are usually present in any case in a vehicle, an additional calculation unit is not necessary.

It is further advantageous if only the information required for calculating the target torque is transferred from the first to the second calculation unit. This is useful when, for example, better utilization of the capacity of the calculation units is thereby ensured.

Preferably a time span that is required for a data transfer from the first to the second calculation unit is taken in account in calculating the target torque. This makes possible an accurate adaptation of the electrical torque when the method is distributed between two calculation units, and when communication between said calculation units is therefore necessary.

A calculation unit according to the present invention, e.g. a control unit of a motor vehicle, is set up to carry out, in particular by programmed execution, a method according to the present invention.

Implementation of the method in the form of software is also advantageous since this results in particularly low costs, especially when an executing control unit is also used for further tasks and is therefore present in any case. Suitable data media for furnishing the computer program are, in particular, diskettes, hard drives, flash memories, EEPROMs, CD-ROMs, DVDs, and many more. Downloading of a program via computer networks (Internet, intranet, etc.) is also possible.

Further advantages and embodiments of the invention are evident from the description and from the appended drawings.

It is understood that the features recited above and those yet to be explained below are usable not only in the respective combination indicated, but also in other combinations or in isolation, without departing from the scope of the present invention.

DETAILED DESCRIPTION

Figure 1:
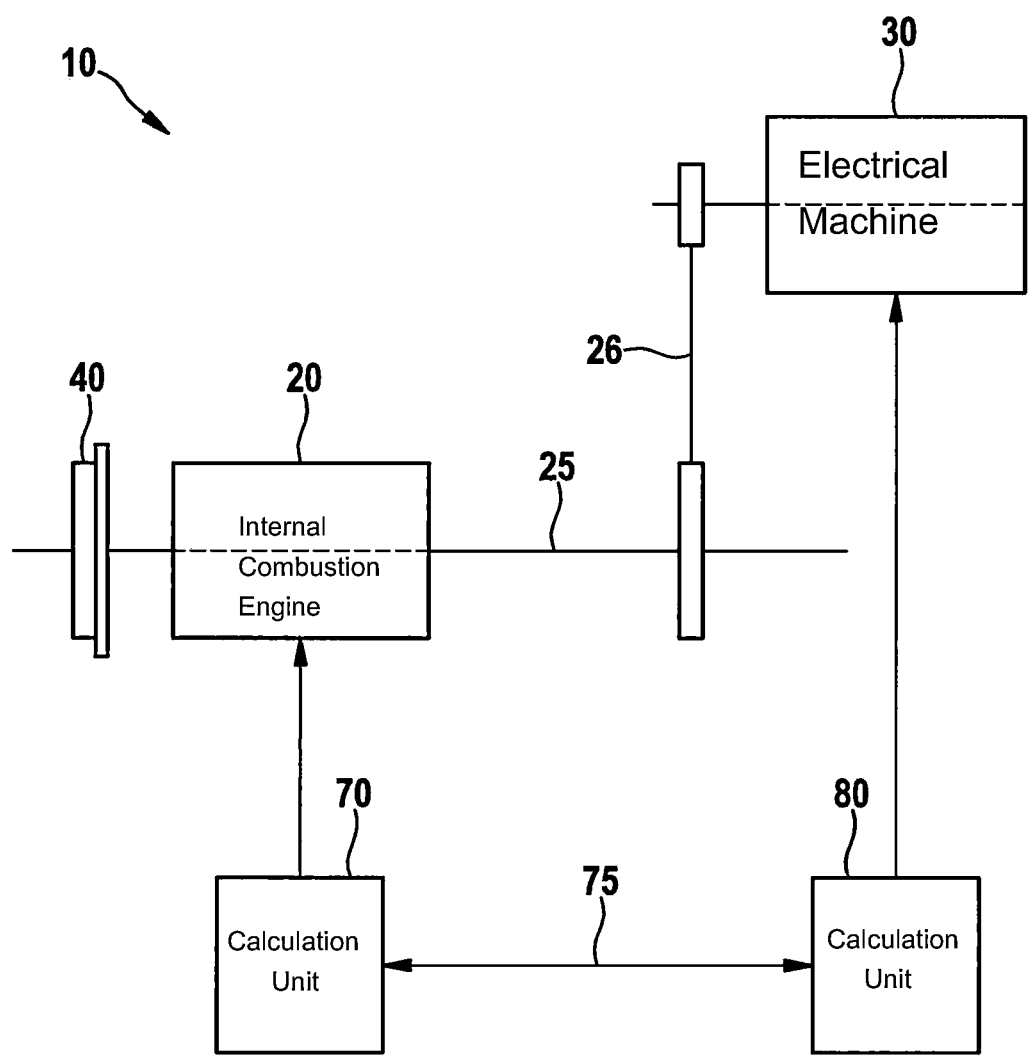
FIG. 1 schematically shows a part of a vehicle encompassing an internal combustion engine, an electrical machine, an operative connection, and calculation units, in a preferred embodiment.

FIG. 1 schematically shows a part 10 of a vehicle in a preferred embodiment, said part encompassing an internal combustion engine 20 and an electrical machine 30 that can be, for example, a starter generator or a boost recuperation machine (BRM), in particular of claw-pole design. Internal combustion engine 20 and electrical machine 30 are connected via an operative connection that is embodied here as a belt drive 26 that is connected to a crankshaft 25 of the internal combustion engine.

Also shown are two calculation units 70 and 80 that are embodied here as first control unit 70 for the internal combustion engine and as second control unit 80 for the electrical machine. First control unit 70 and second control unit 80 communicate via a communication connection 75 that can be, for example, a CAN bus. It is also possible to use different calculation units, or also only one calculation unit, for the method according to the present invention.

Values for an angle of crankshaft 25 and for at least one cylinder filling of internal combustion engine 20 are present in first control unit 70 by which internal combustion engine 20 is controlled. These values are measured, for example, by suitable sensors or measurement transducers. From these values, first control unit 70 calculates a torque $M_{20}$ (see FIG. 2) of internal combustion engine 20 over time.

First control unit 70 can employ, for example, a characteristic curve as a function of the angle of crankshaft 25 if the cylinder filling remains approximately constant, or e.g. a characteristics field as a function of the angle of crankshaft 25 and the cylinder filling.

In order to prevent or at least reduce vibrations that occur due to irregular running of internal combustion engine 20, i.e. a varying total torque, and that become transferred to the vehicle, a total torque $M_{25}$ that is acting on crankshaft 25 is adapted so that it changes as little as possible over time.

Contributions to the total torque $M_{25}$ are supplied by the torque $M_{20}$ of internal combustion engine 20 and an electrical torque $M_{30}$. The electrical torque $M_{30}$ is the torque exerted by electrical machine 30 on crankshaft 25, the interposition of belt drive 26 already being accounted for here.

Further contributions to the total torque $M_{25}$ are supplied in particular by a frictional torque and, for example, by a two-mass flywheel torque. In internal combustion engines such as reciprocating piston engines, an inertial mass such as a flywheel is often used in order to balance out rotational irregularities, since a torque is not transferred to the crankshaft by a cylinder at each stroke. In modern vehicles this inertial mass is split in two, with a primary mass on the engine side and a secondary mass on the transmission side of a torsional vibration damper. Vibrations above idle speed are thereby further reduced, but an amplification of vibrations below idle speed can occur; this is particularly obtrusive as the internal combustion engine is switched off.

Because the frictional torque changes only insignificantly as a function of the rotation speed of crankshaft 25, it need no longer be taken into account hereinafter in order to minimize the gradient of the total torque $M_{25}$.

The two-mass flywheel torque of two-mass flywheel 40 which acts on crankshaft 25 is a function of a difference in rotation angle between the primary and secondary mass, and of the change over time therein. The primary mass is joined rigidly to crankshaft 25. Upon shutoff of the internal combustion engine, i.e. as the internal combustion engine runs down, a clutch is open and the torque of the secondary mass is therefore a function only of the two-mass flywheel torque on the crankshaft and of the inherent inertia. A reduction in the change in the angular acceleration of the crankshaft consequently results in a reduction in the two-mass flywheel torque. The two-mass flywheel torque therefore also no longer needs to be taken into account. What is minimized is therefore the change in the total torque $M_{25}$, where $M_{25}=M_{20}+M_{30}$.

Figure 2A:
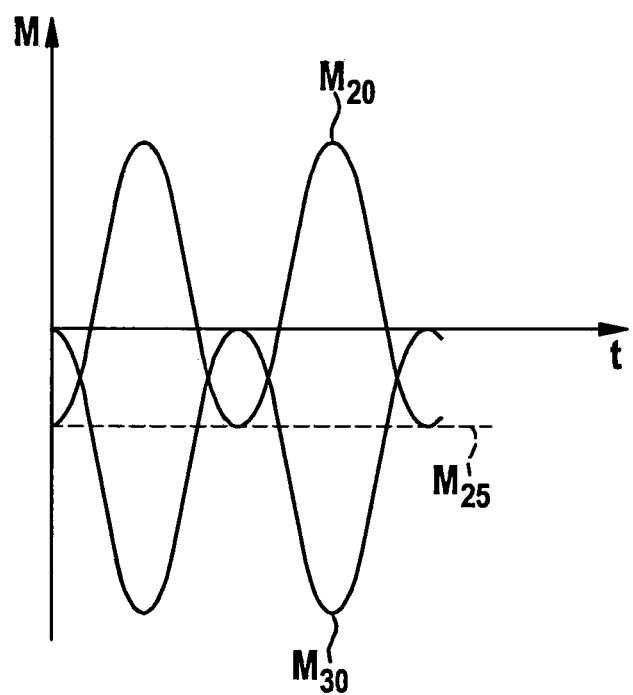
FIG. 2a schematically shows a curve for a torque of an internal combustion engine and for an electrical torque and a total torque, in a preferred embodiment.

FIG. 2a schematically shows, in a diagram, the curve for the torque $M_{20}$ of internal combustion engine 20 and the curve for the electrical torque $M_{30}$, as well as the total torque $M_{25}$ resulting therefrom, in a preferred embodiment. Time is indicated from left to right, and torques are plotted in the vertical direction. Positive values represent a torque in the crankshaft rotation direction; negative values represent a torque opposite to the crankshaft rotation direction.

In a preferred embodiment, it is intended that $M_{30}=-M_{20}+$ offset for the total torque. The torque $M_{20}$ of internal combustion engine 20 is thereby compensated for by the electrical torque $M_{30}$, an offset also being taken into account so that the absolute value of the ultimately resulting total torque does not become too small to ensure quick shutoff of the internal combustion engine. It is also possible thereby to ensure that, for example, only a braking torque of the electrical machine is used, but a motor torque of the electrical machine is also conceivable.

The target torque for the electrical torque $M_{30}$ is calculated in first control unit 70. The calculation takes into account a transit time T required for transfer of the target torque from first control unit 70 via communication medium 75 to second control unit 80. This transit time can be in the range of a few or a few tens of milliseconds, and can therefore correspond to one or more time units of the gradient determination. In other words, at a time t1 the target torque that will be required at a later time t2=t1+T must be calculated in first control unit 70. This is possible because the cylinder filling does not change between the compression and expansion strokes, and because it is assumed approximately that the rotational speed of crankshaft 25 does not change during the transit time T. The angle of crankshaft 25 at time t2 can thus be calculated by adding to the angle at time t1 the product of the rotational speed of crankshaft 25 and the transit time T. The time T can also encompass a delay time between the time at which the target torque for the electrical machine is defined and the time at which the actual torque reaches the target torque. For a typical BRM a delay time of this kind in the transfer function is approximately 5 ms.

The target torque calculated by first control unit 70 is transferred via communication medium 75 to second control unit 80. Second control unit 80 causes the electrical machine to apply to crankshaft 25 the electrical torque $M_{30}$ corresponding to the target torque.

If the electrical machine is a preferred claw pole generator with electrical excitation, the current through the rotor winding serves as a control variable for regulating the electrical torque, and is defined by an associated field controller. The field controller nowadays is usually part of a so-called generator controller (here, for example, second control unit 80) that also performs further control functions in addition to voltage regulation.

It is also conceivable for the information regarding the angle of crankshaft 25 and the cylinder filling of internal combustion engine 20 to be transferred from first control unit 70 to second control unit 80. Calculation of the target torque is then carried out in second control unit 80. The transit time T must also correspondingly be taken into account here in the calculation.

It is furthermore conceivable to use for the method according to the present invention, instead of first control unit 70 and second control unit 80, only one shared control unit that has the required information regarding the angle of crankshaft 25 and the cylinder filling of internal combustion engine 20 and can cause the electrical machine to apply to crankshaft 25 an electrical torque corresponding to the target torque. A transit time for a transfer would then not need to be taken into account.

Figure 2B:
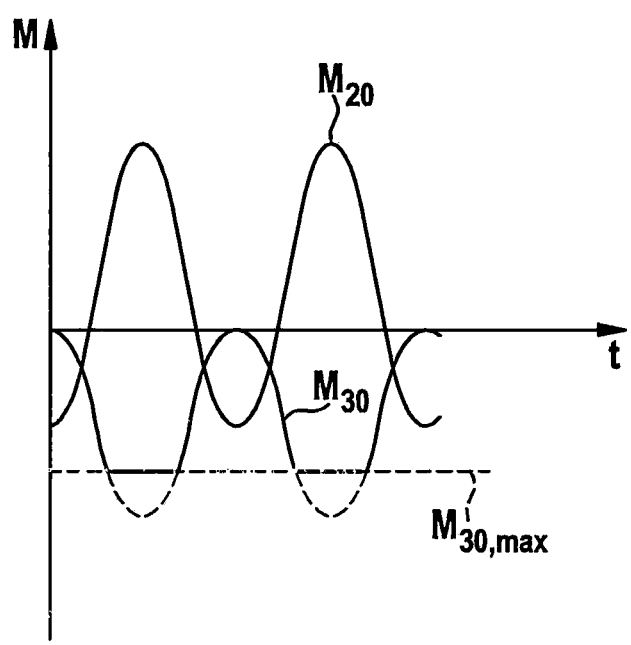
FIG. 2b schematically shows a curve for a torque of an internal combustion engine and an adapted curve for an electrical torque and for a maximum electrical torque, in a preferred embodiment.

FIG. 2b schematically depicts, in a diagram, a curve for the torque $M_{20}$ of internal combustion engine 20 and a curve for the electrical torque $M_{30}$, as well as a maximum electrical torque $M_{30,max}$, according to a preferred embodiment of the invention. Time is indicated from left to right, and torques are plotted in the vertical direction. Positive values represent a torque in the crankshaft rotation direction; negative values represent a torque opposite to the crankshaft rotation direction.

In a further preferred embodiment the electrical torque $M_{30}$ is adapted so that the negative $-M_{20}$ of the torque of internal combustion engine 20 is scaled by a factor, and/or is otherwise adapted, before an offset is added. This is useful when the absolute value of the maximum electrical torque $M_{30,max}$ that can maximally be applied by electrical machine 30 to crankshaft 25 is less than the amplitude of the torque $M_{20}$ of the torque of internal combustion engine 20. Complete compensation for the torque of internal combustion engine 20 is thus not possible.

In the curve for the electrical torque $M_{30}$ shown in FIG. 2b, said torque is adapted so that the negative $-M_{20}$ of the torque of internal combustion engine 20 has been scaled by a factor, and additionally the peaks in a negative direction have been cut off in accordance with the maximum electrical torque $M_{30,max}$.

It is also conceivable to utilize only one of the two adaptation possibilities. It is also possible to cut off the peaks in the other direction, i.e. for the peaks to be cut off by the zero line, taking into account correspondingly the selection of the offset.

It is furthermore conceivable also to use a motor torque of the electrical machine and not only a braking torque. The curve for the electrical torque $M_{30}$ can then also extend into the upper, positive half of the diagram. More adaptation capabilities can thereby become accessible.

What is claimed is:

1. A method for shutting off an internal combustion engine in a vehicle that includes a machine comprising a control system, an internal combustion engine, and an electrical machine, the method comprising:
   upon determining a beginning of a shutoff operation of the internal combustion engine, adapting, by the control system, an electrical torque of the electrical machine such that a total torque does not change per unit time by more than a predefined threshold, wherein the total torque includes at least a torque of the internal combustion engine and the electrical torque, wherein the adapting includes calculating a target torque of the electrical machine as a function of a present torque of the internal combustion engine and causing the electrical machine to adjust the electrical torque in accordance with the target torque.

2. The method as recited in claim 1, further comprising calculating, by the control system, the torque of the internal combustion engine from an angle of a crankshaft and a cylinder filling of the internal combustion engine.

3. The method as recited in claim 1, wherein the electrical torque is a function of the torque of the internal combustion engine.

4. A non-transitory machine-readable storage medium having stored thereon a computer program that is executable by control system and that, when executed by the control system, causes the control system to carry out a method for shutting off an internal combustion engine in a vehicle that includes an internal combustion engine and an electrical machine, the method comprising:
   upon determining a beginning of a shutoff operation of the internal combustion engine, adapting an electrical torque of the electrical machine such that a total torque does not change per unit time by more than a predefined threshold, wherein the total torque includes at least a torque of the internal combustion engine and the electrical torque, wherein the adapting includes calculating a target torque of the electrical machine as a function of a present torque of the internal combustion engine and causing the electrical machine to adjust the electrical torque in accordance with the target torque.

5. The non-transitory machine-readable storage medium as recited in claim 4, wherein the computer program is executable by a first calculation unit of the control system for carrying out the method in conjunction with a second calculation unit of the control system that is communicatively coupled to the first calculation unit.

6. The method as recited in claim 1, wherein the target torque of the electrical machine corresponds to a negative of the torque of the internal combustion engine together with an offset.

7. A calculation unit, comprising:
   circuitry configured to perform a method for shutting off an internal combustion engine in a vehicle that includes an internal combustion engine and an electrical machine, the method comprising:
      upon determining a beginning of a shutoff operation of the internal combustion engine, adapting an electrical torque of the electrical machine such that a total torque does not change per unit time by more than a predefined threshold, wherein the total torque includes at least a torque of the internal combustion engine and the electrical torque, wherein the adapting includes calculating a target torque of the electrical machine as a function of a present torque of the internal combustion engine and causing the electrical machine to adjust the electrical torque in accordance with the target torque, and wherein a time span of a transfer function of the electrical machine is taken into account in the calculation of the target torque of the electrical machine.

8. The method as recited in claim 1, wherein a time span of a transfer function of the electrical machine is taken into account in the calculation of the target torque of the electrical machine.

9. The method as recited in claim 1, wherein the target torque of the electrical machine is calculated in a calculation unit of the control system and is transferred from the calculation unit to a second calculation unit of the control system that adjusts the electrical torque, of the electrical machine, in accordance with the target torque.

10. The method as recited in claim 1, wherein the target torque of the electrical machine is calculated in a second calculation unit of the control system that adjusts the electrical torque, of the electrical machine, in accordance with the target torque, wherein information required for calculating the target torque is previously transferred from a first calculation unit of the control system to the second calculation unit.

11. The method as recited in claim 10, wherein a time span that is required for a data transfer from the first calculation unit to the second calculation unit is taken into account in the calculation of the target torque of the electrical machine.

12. A control system comprising:
    at least one interface for interfacing with an electrical machine and a sensor; and
    circuitry configured to perform a method for shutting off an internal combustion engine in a vehicle that includes the sensor, the internal combustion engine, and the electrical machine, the method comprising:
       upon determining a beginning of a shutoff operation of the internal combustion engine, communicating with the electrical machine via the at least one interface to adapt, based on output obtained via the at least one interface from the sensor, an electrical torque of the electrical machine such that a total torque does not change per unit time by more than a predefined threshold, wherein the total torque includes at least a torque of the internal combustion engine and the electrical torque, wherein the adaptation includes calculating a target torque of the electrical machine as a function of a present torque of the internal combustion engine and causing the electrical machine to adjust the electrical torque in accordance with the target torque.

13. A method for shutting off an internal combustion engine in a vehicle that includes a machine comprising a control system, an internal combustion engine, and an electrical machine, the method comprising:
    upon determining a beginning of a shutoff operation of the internal combustion engine, adapting, by the control system, an electrical torque of the electrical machine such that a change per unit time in a total torque is zero, wherein the total torque includes at least a torque of the internal combustion engine and the electrical torque, wherein the adapting includes calculating a target torque of the electrical machine as a function of a present torque of the internal combustion engine and causing the electrical machine to adjust the electrical torque in accordance with the target torque.

14. The method as recited in claim 13, wherein the target torque of the electrical machine corresponds to an offset plus a negative of the torque of the internal combustion engine scaled with a factor.

\* \* \* \* \*